United States Patent [19]

Aiello et al.

[11] Patent Number: 5,064,123

[45] Date of Patent: Nov. 12, 1991

[54] INSECTICIDE DISPENSING APPARATUS

[75] Inventors: Salvatore F. Aiello; Edward J. Lazzeroni, Sr., both of Caledonia; John F. Ouella, Racine; Cyril Ouella, Racine; William J. Maurino, Kenosha; Donald F. Karasek, Racine; Jeffrey K. Brown, Wind Point, all of Wis.

[73] Assignee: S. C. Johnson & Son, Inc., Racine, Wis.

[21] Appl. No.: 521,507

[22] Filed: May 10, 1990

[51] Int. Cl.$^5$ .................. B05B 5/025; B05B 1/08; B05B 7/08

[52] U.S. Cl. .................... 239/706; 239/708; 239/99; 239/128; 239/146; 239/305; 239/335; 239/346; 239/373; 239/526; 239/549; 239/588

[58] Field of Search ............... 239/704, 706, 708, 99, 239/101, 128, 146, 172, 304–307, 335, 346, 366, 368, 369, 373, 525, 526, 532, 549, 588; 43/900

[56] References Cited

U.S. PATENT DOCUMENTS

| | | | |
|---|---|---|---|
| D. 295,442 | 4/1988 | Witte | D23/226 |
| 1,547,545 | 7/1925 | Wood . | |
| 1,979,135 | 10/1934 | Altenburger et al. | 239/532 |
| 2,772,921 | 12/1956 | Nance | 239/373 |
| 2,807,502 | 9/1957 | Tharp | 239/588 |
| 2,943,797 | 7/1960 | Neilson | 239/305 |
| 2,953,305 | 9/1960 | Bondurant | 239/373 |
| 3,016,200 | 1/1962 | Boehm | 239/373 |
| 3,018,927 | 1/1962 | Pinke et al. . | |
| 3,194,438 | 7/1965 | Walker et al. | 239/172 |
| 3,265,308 | 8/1966 | Hopkins | 239/172 |
| 3,380,658 | 4/1968 | Stasz et al. . | |
| 3,402,741 | 9/1968 | Yurdin | 239/588 |
| 3,403,818 | 10/1968 | Enssle . | |
| 3,504,858 | 4/1970 | Liddiard | 239/373 |
| 3,575,348 | 4/1971 | MacKay | 239/526 |
| 3,623,669 | 11/1971 | Woods | 239/307 |
| 3,680,786 | 8/1972 | Levy | 239/146 |
| 3,764,072 | 10/1973 | Morehouse et al. | 239/308 |
| 3,797,744 | 3/1974 | Smith | 239/305 |
| 3,799,451 | 3/1974 | Kollmai | 239/312 |
| 3,901,449 | 8/1975 | Bochmann | 239/332 |
| 3,904,116 | 9/1975 | Jones et al. | 239/532 |
| 3,905,552 | 9/1975 | Hall et al. | 239/101 |
| 3,940,065 | 2/1976 | Ware et al. | 239/146 |
| 3,977,602 | 8/1976 | Kirch | 239/308 |
| 4,135,669 | 1/1979 | Bridges et al. | 239/373 |
| 4,197,995 | 4/1980 | Campbell et al. . | |
| 4,291,839 | 9/1981 | Brett | 239/289 |
| 4,341,347 | 7/1982 | DeVittorio | 239/706 |
| 4,341,350 | 7/1982 | Wemmer | 239/312 |
| 4,367,198 | 1/1983 | Scordato et al. | 222/372 |
| 4,407,454 | 10/1983 | Massey | 239/525 |
| 4,546,922 | 10/1985 | Thometz | 239/304 |
| 4,561,037 | 12/1985 | MacLaine et al. | 239/706 |
| 4,621,770 | 11/1986 | Sayen | 239/304 |
| 4,667,880 | 5/1987 | Paulsen et al. | 239/304 |
| 4,842,203 | 6/1989 | Kuhn et al. | 239/708 |

Primary Examiner—Andres Kashnikow
Assistant Examiner—Karen B. Merritt

[57] ABSTRACT

A device which can dispense at least one pesticide which comprises a base unit (10) containing tanks (40, 42) for the pesticides and a wand (100) including valves (212, 134) to control dispensing of the pesticides, an electrode (280) to place an electrostatic charge on one pesticide, and a pulsing unit (128) to pulse the flow of one pesticide.

2 Claims, 8 Drawing Sheets

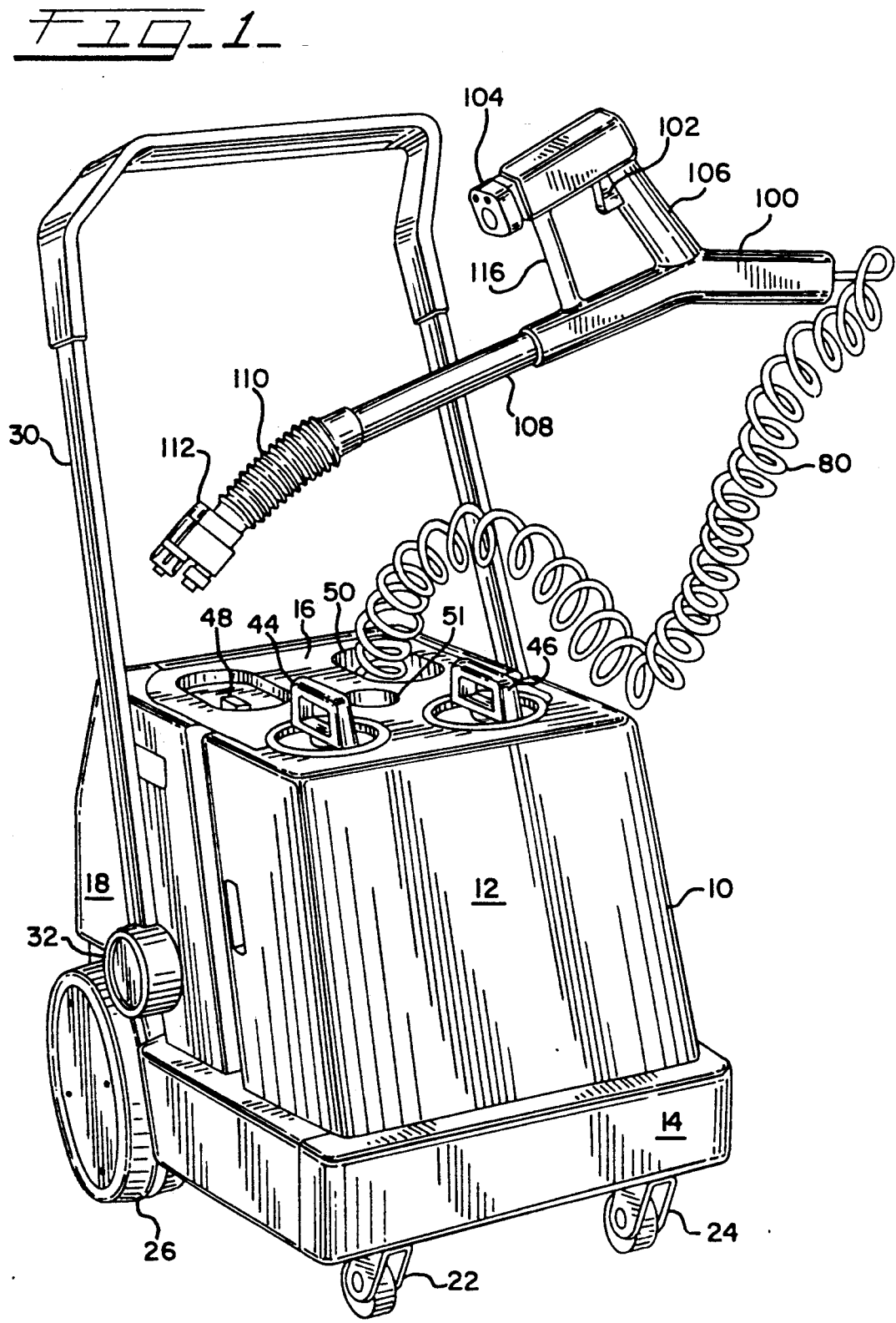

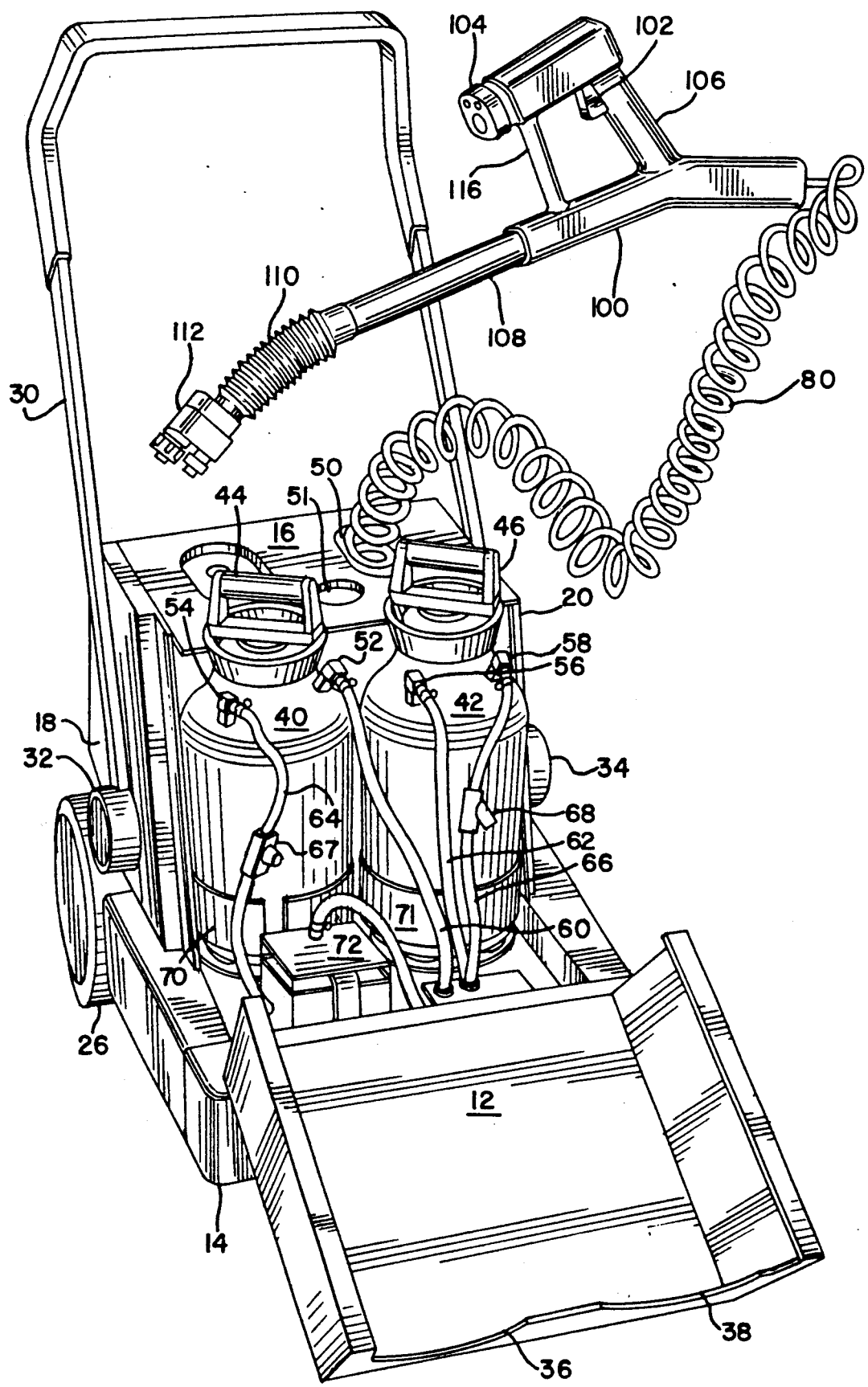

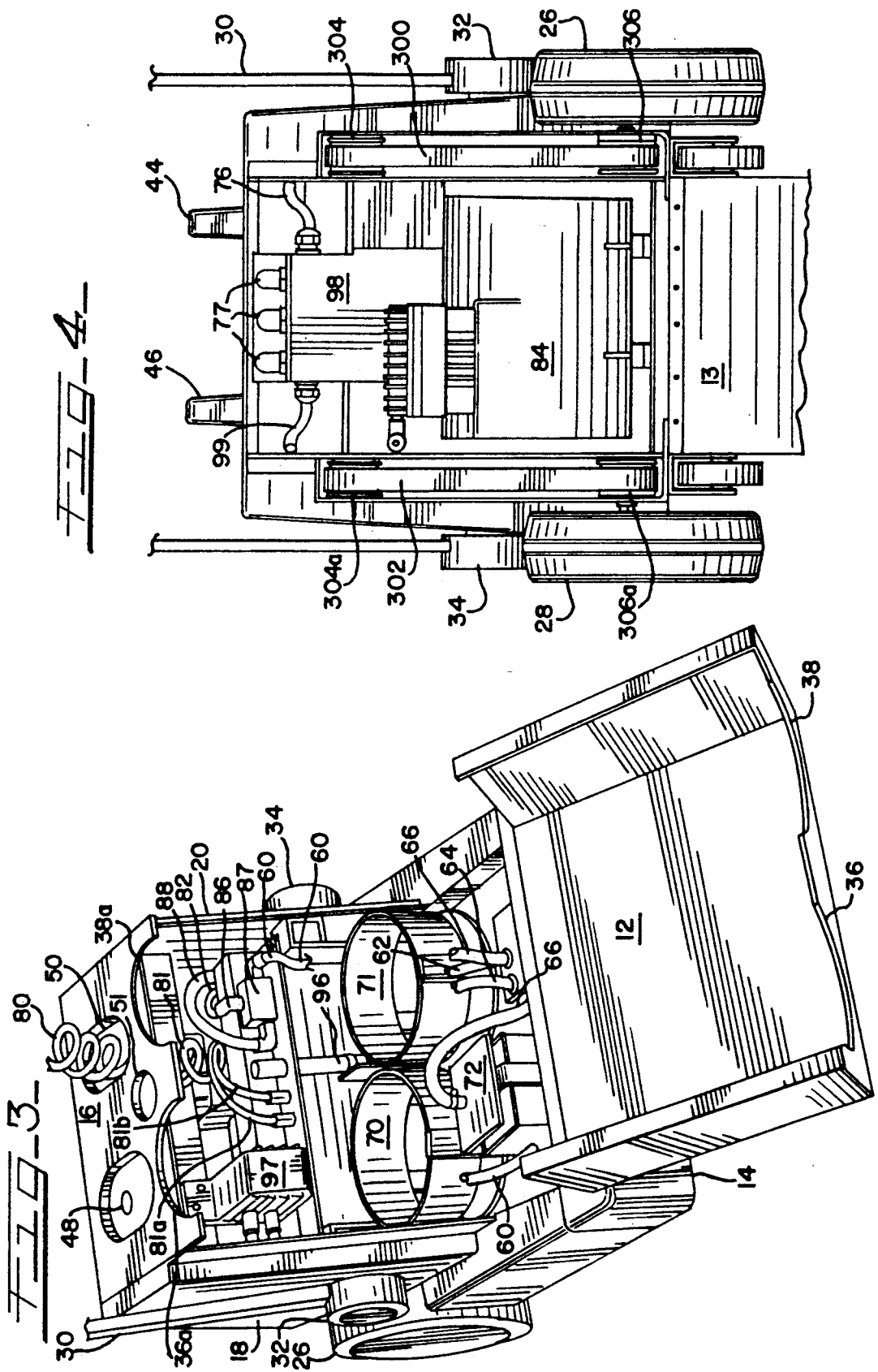

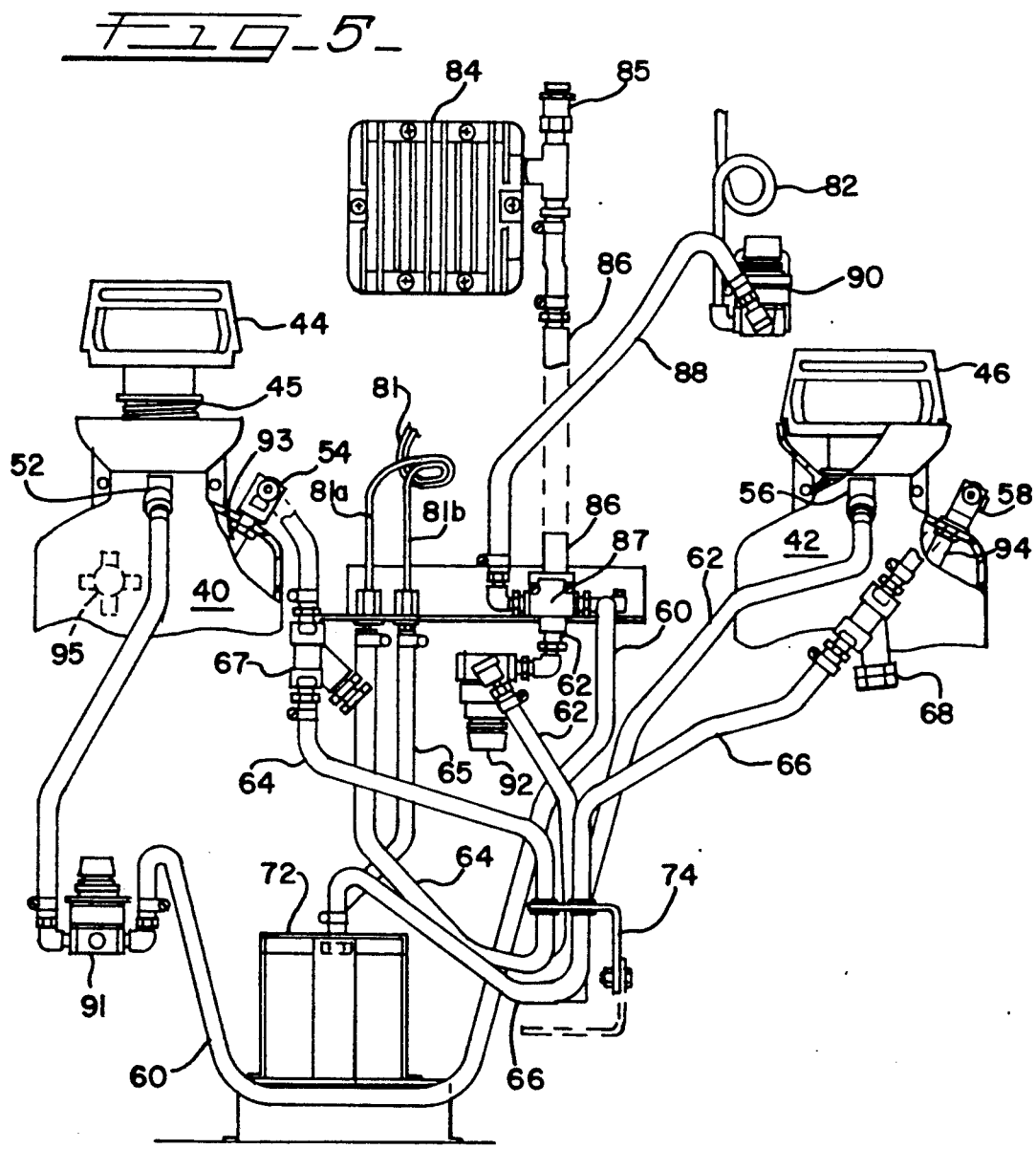

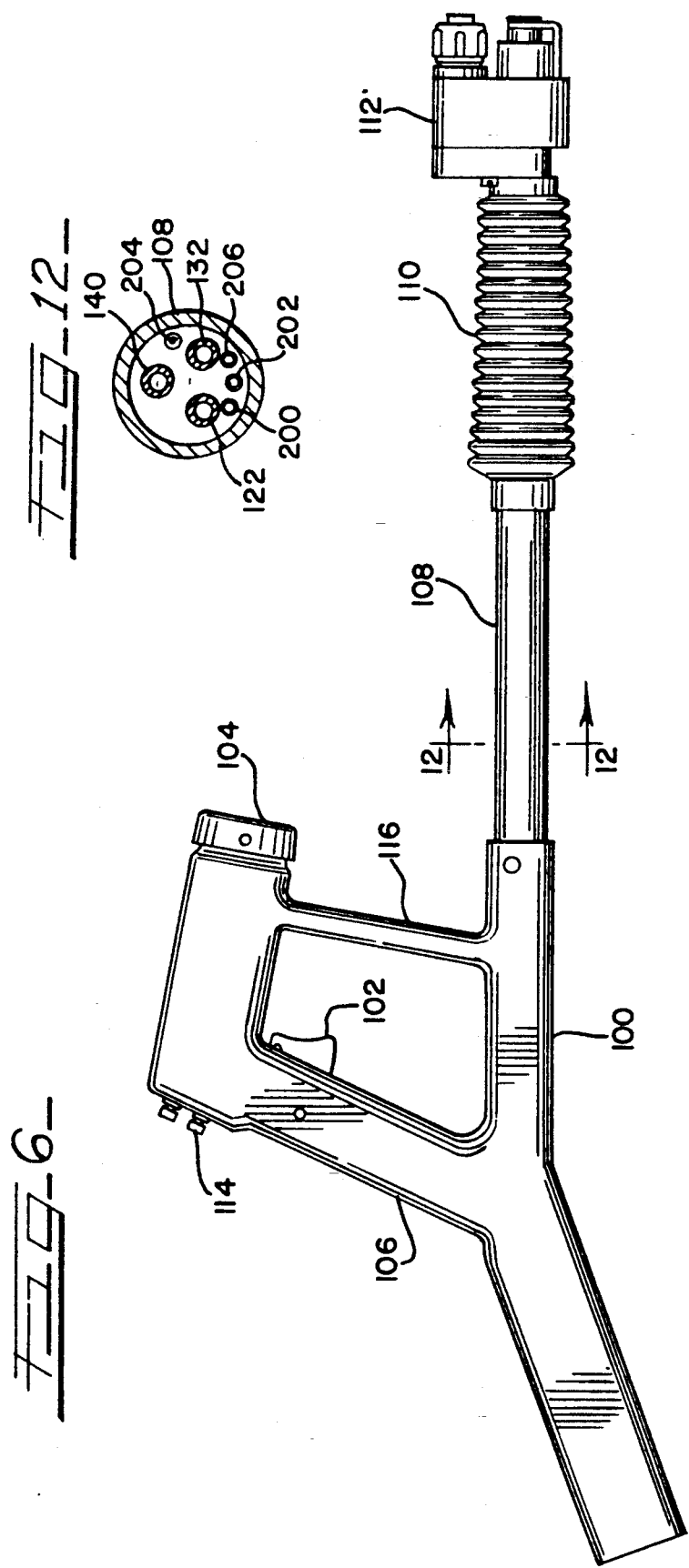

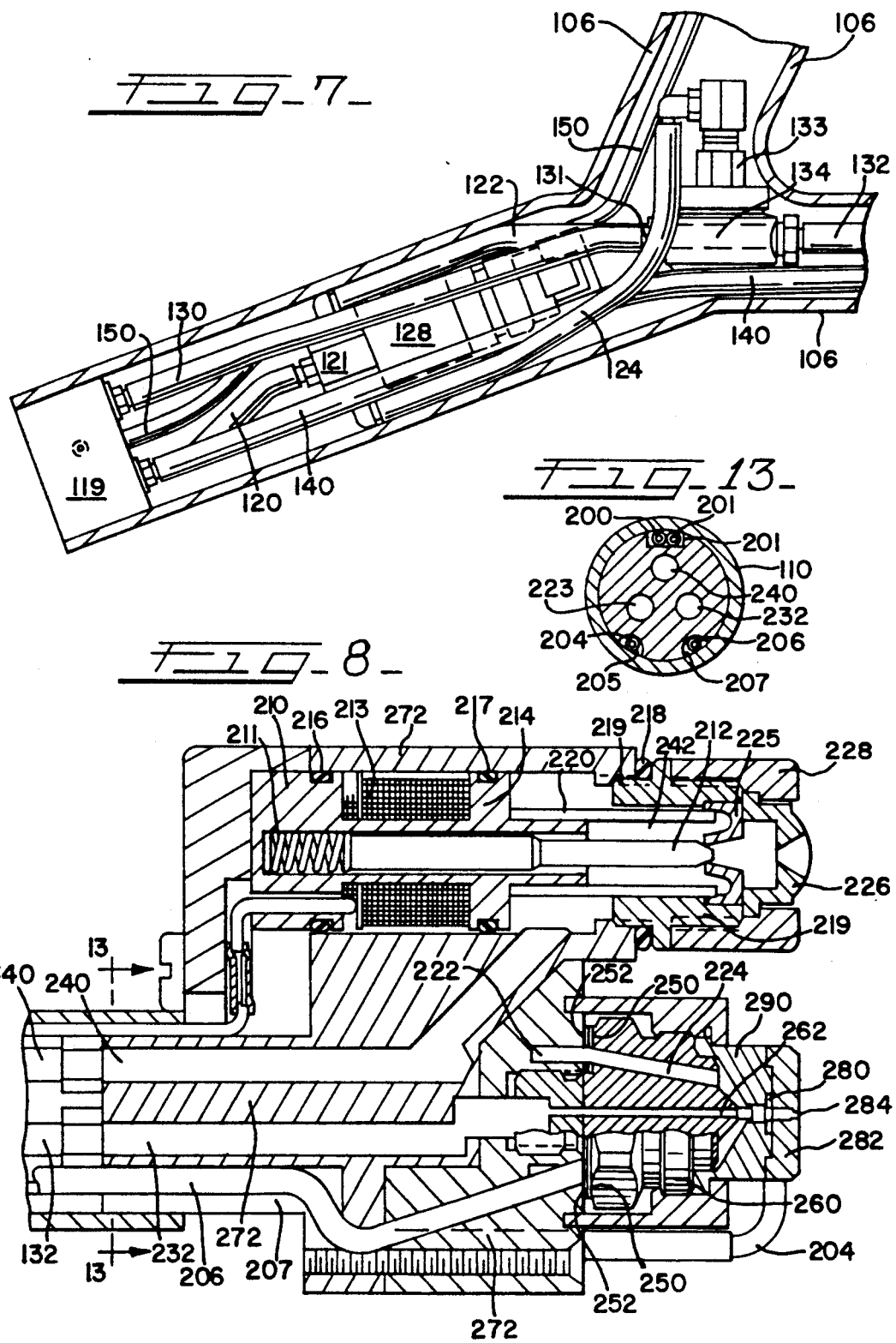

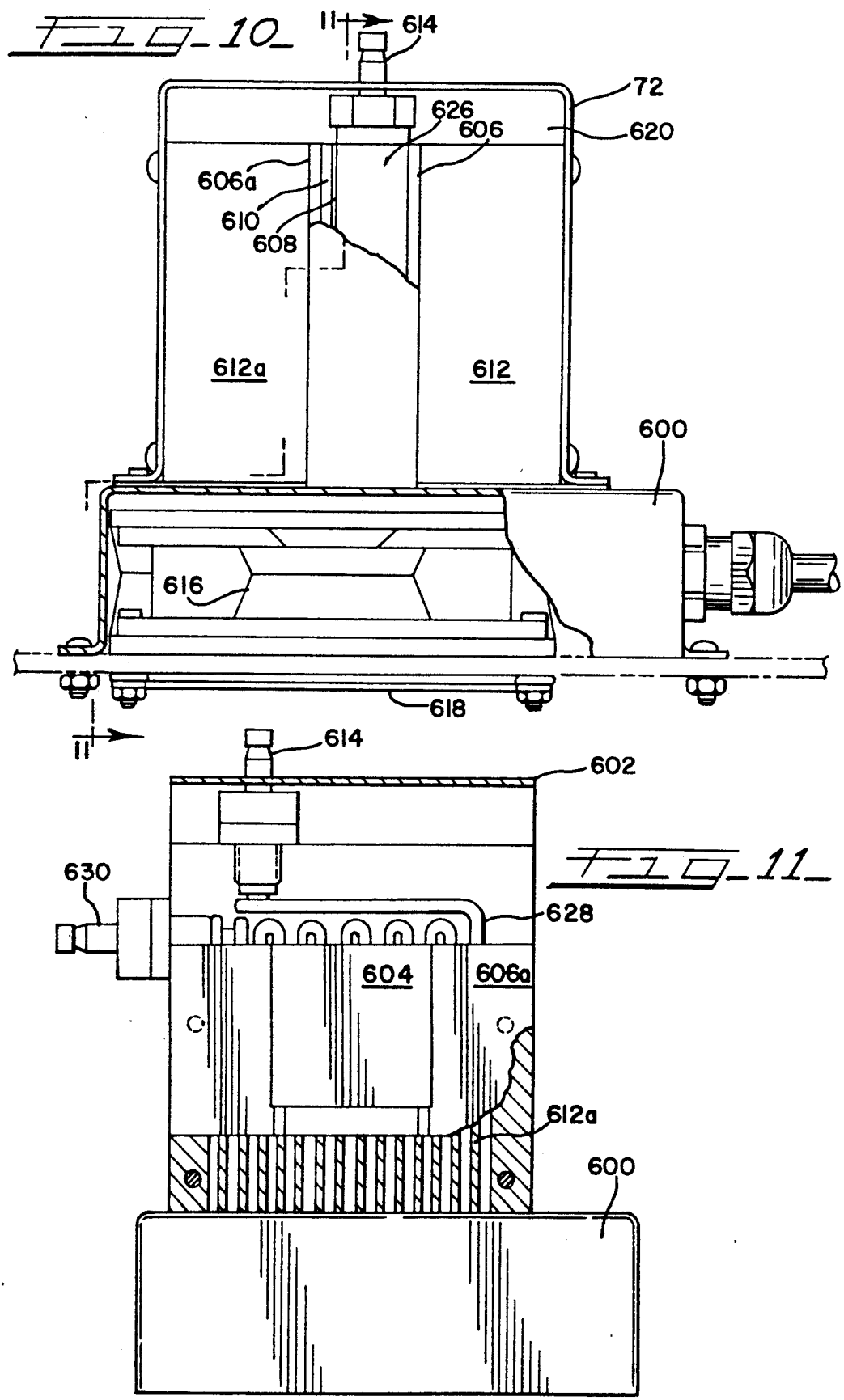

5,064,123

INSECTICIDE DISPENSING APPARATUS

TECHNICAL FIELD

This invention relates to devices to dispense insecticides for use by commercial pest elimination services or other pest control. More particularly, it relates to a device to dispense two different pesticides through a single wand.

BACKGROUND OF THE INVENTION

Commercial pest elimination services have used devices to dispense pesticides or insecticides for a long time. These devices include a source of the pesticide, a source of air pressure and a wand or other dispensing means to place the pesticide in the desired location, often mounted on a cart for mobility, see U.S. Pat. No. 3,265,308.

U.S. Pat. No. 3,194,438 discloses a cleaning machine designed to dispense chemicals from tanks 7 mixed with water and air. The tanks are controlled by valves 30 and mixed with the air in nozzle N.

U.S. Pat. No. 3,575,348 describes a device for rinsing and washing using water pressure to dispense an active material from tank 32. The water and chemical are mixed in venturi device 42.

U.S. Pat. No. 3,797,744 discloses a cleaning device comprising a series of tanks for cleaning chemicals, a source of air pressure and water. The chemicals are mixed with the air and water in the spray nozzle. The device also shows a separate nozzle for dispensing a mixture of air and oil.

It is also known to use an electrostatic charge to assist in the dispensing of insecticides, see U.S. Pat. Nos. 4,341,347, 4,275,846, 4,356,528, 4,358,059, and 4,362,275.

DESCRIPTION OF THE INVENTION

This invention relates to a self-contained insect control system comprising: 1) a mobile platform which includes a first supply means for a first pesticide, a second supply means for a second pesticide and air pressure supply means; 2) a wand separately in communication with the first supply means, the second supply means and the air pressure supply means and including means to pulse the flow of the first pesticide; means to selectively dispense any combination of the first pesticide, the second pesticide, and air from the air pressure supply means; and means to place an electrostatic charge on the first pesticide as it is sprayed.

DESCRIPTION OF THE DRAWINGS

FIG. 1 is a front ¼ view of the cart with the attached

FIG. 2 is a front ¼ view of the cart with the front open to show the tanks and partial hose routing;

FIG. 3 is a view similar to FIG. 2 of the cart but with the tanks removed to show added detail;

FIG. 4 is a rear view of the unit with the back removed to show the interior detail;

FIG. 5 is a schematic view of the hose routing;

FIG. 6 is a side view of the wand;

FIG. 7 is an enlarged view of the wand handle, broken away to show the detail;

FIG. 8 is an enlarged view of the nozzle section of the wand broken away to show the detail;

FIG. 10 is a detail view of the chiller device; and

FIG. 11 is a view of the chiller device taken along line 11—11 in FIG. 10.

FIG. 12 is a view of the wand barrel taken along line 12—12 in FIG. 6.

FIG. 13 is a view of the wand barrel taken along line 13—13 in FIG. 8.

DESCRIPTION OF THE BEST MODE

Figure 9:
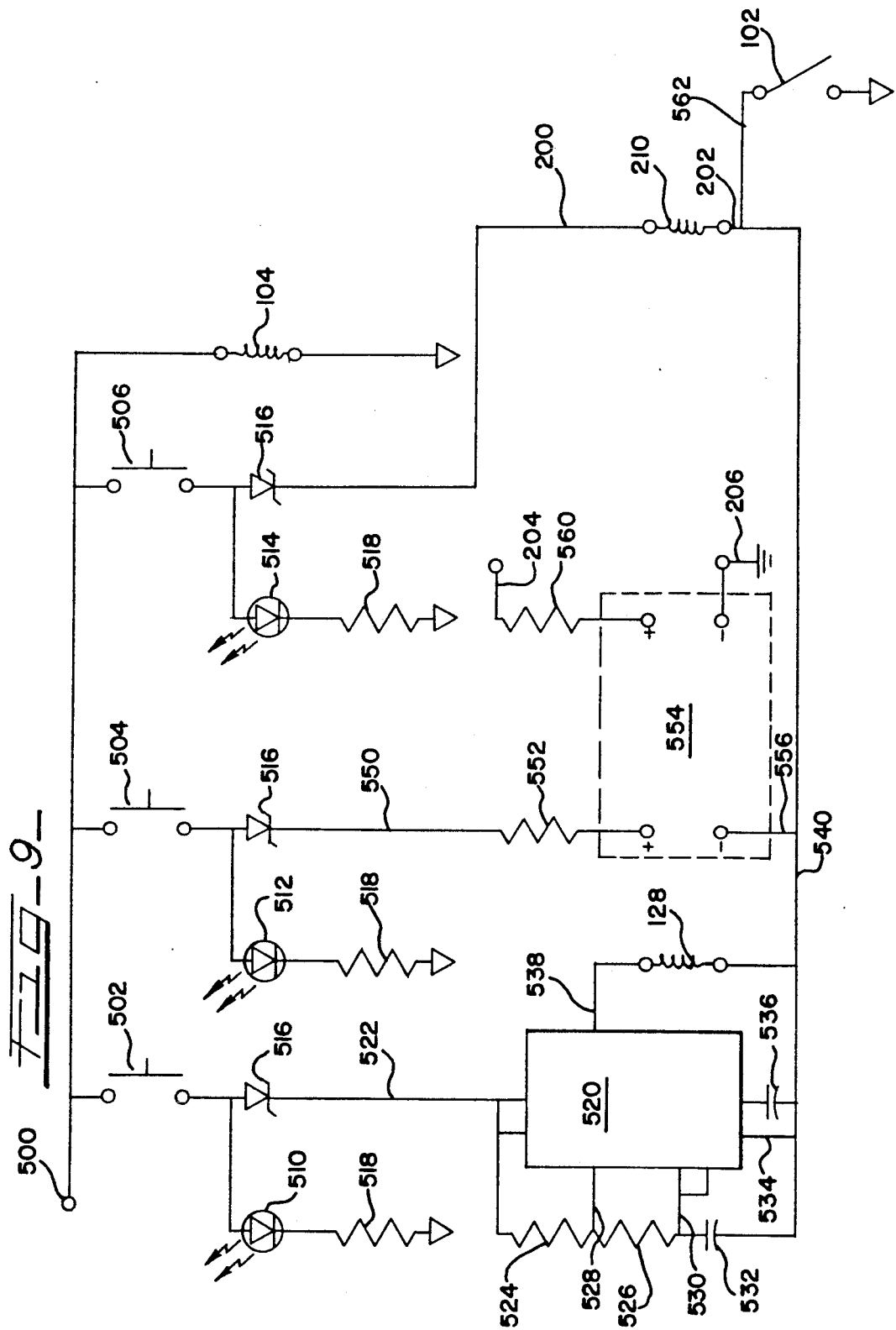
FIG. 9 is an electrical schematic for the wand.

Referring to FIG. 1, the device of the present invention comprises cart 10 and wand 100 connected to cart 10 by flexible hose 80, which schematically contains a power cord and three separate hoses. Flexible hose 80 can be replaced by a separate power cord and/or separate hoses. Cart 10 has a removable front cover 12 which is held in place by two hinges, not shown, and a bumper strip 14 around the front and the right and left sides. Cart 10 has a top housing 16 and side housings 18 and 20, shown in FIG. 3. Cart 10 has two front wheels 22 and 24, both of which can rotate 360°, and two rear wheels 26 and 28, shown in FIG. 4. Cart 10 also has handle 30 connected to the side housings 18 and 20 by pivot means 32 and 34, shown in FIG. 4. One or both of pivot means may include means, not shown, to lock handle 30 in a series of preset positions for easy movement of the cart.

Front cover 12 has two cutouts 36 and 38, shown in FIG. 2, which fit around the top of tanks 40 and 42, shown in FIG. 2. Top housing 16 also has two cutouts 36a and 38a which mate with cutouts 36 and 38 to provide openings in the outer housing for tanks 40 and 42. Tank handles 44 and 46 for tanks 40 and 42 enable the operator to easily remove the tanks for refilling. Top housing 16 includes an on-off switch 48 and an opening 50 for flexible hose 80.

Flexible hose 80 is connected to the rear end of wand 100. Wand 100 includes a trigger 102, a light 104, a hand grip 106, a barrel 108, a flexible barrel 110 and nozzle assembly 112.

In FIG. 2, front cover 12 has been folded down to show the interior of cart 10. Referring also to FIGS. 3 and 5, a view similar to FIG. 2, but with the tanks removed and the schematic hose routing diagram, tanks 40 and 42 are held in place by retaining means 70 and 71. Tank 40 has an opening which is closed by handle 44, FIG. 5 shows screw threads 45, an air inlet port 52 and a liquid out port 54. Tank 40 also may have an optional magnetic stirring device 95 contained inside if the pesticide is subject to separation. Connected to liquid out port 54 is a draw tube 93, which extends to the bottom of tank 40. Air inlet port 52 is connected to air line 60. The air pressure in air line 60 is regulated by pressure regulator 91. Air line 60 is connected to the air manifold 87. Liquid out port 54 is connected to liquid line 64, which includes conventional filter device 67. Liquid line 64 is connected to line 81a, which is part of two hose line 81 which makes up a portion of flexible hose 80 to wand 100.

Tank 42 is connected to the air supply in a manner similar to tank 40. Air line 62 includes a pressure regulator 92 to regulate the air pressure to tank 42. Air line 62 is connected to air inlet port 56. Liquid outlet port 58 is connected to a draw tube 94, which extends to the bottom of tank 42 and to liquid line 66, which has a conventional filter 68. Liquid line 66 can either pass directly to line 81b which forms part of flexible hose 81 or preferably can pass through chiller device 72. The liquid from chiller device 72 has been cooled to a temperature within the range of 0° C. to 10° C. This enhances the effectiveness of certain pesticides, such as pyrethrum and the synthetic pyrethroids, by reducing the degradation of the pesticide. The outlet of chiller 72 is connected to liquid line 65, which is connected to line 81b. Bracket 74 holds lines 62, 64 and 66 in place to prevent tangling and to keep them out of the way of the operator when changing the tanks.

The air pressure for the device is supplied by conventional air compressor 84. The outlet of air compressor 84 is connected to air line 86 which connects to the air manifold. Air line 86 includes a pressure relief valve 85. Air manifold is connected to air lines 60, 62 and 88. Air line 88 includes a pressure regulator 90 and is connected to flexible hose 82, which can form a portion of flexible hose 80 to wand 100. Transformer 97 provides the power at the proper voltage for the wand. Tube 96 is a guide tube for the power cord to the wand, not shown. The power cord can be optionally held in place with a retractable cord reel placed below the tanks. FIG. 3 shows opening 51 in top housing 16. This is to hold the wand while the cart is being moved or stored.

FIG. 4 shows a rear view of the cart with rear panel 13 open. Air compressor 84 is visible as is electrical junction box 98. Power cord 99 is the power from the electrical service to the unit. The three power leads 77 leaving junction box 98 are connected to power air compressor 84, the magnetic stirrer, not shown, and the chiller 72. Power lead 76 provides power to transformer 97 for the power to wand 100. Junction box 98 can also be fitted with utility electrical outlets, not shown, for other optional equipment. Belts 300 and 302 are to assist moving the cart up and down stairs. These belts are around pulleys 304, 304*a*, 306 and 306*a*.

FIG. 6 shows a side view of wand 100. Hand grip 106 has three push buttons 114 with LED on/off indicators for controlling the flow of liquid 1 and liquid 2, as well as the power to the electrostatic device. Light 104 is to enable the operator to see in tight and dark locations without having to carry an extra light. Cross brace 116 is an optional support member. It functions to protect the operator's hand and gives support to the wand. It can also be used to route the electrical wiring to the nozzle assembly. Flexible barrel 110 is made so that the barrel can be bent to fit into tight locations and around corners. Under flexible barrel covering 110 is any conventional means to create a bendable barrel. Barrel 108 and flexible barrel 110 are hollow and contain tubes for the liquids and the air as well as wiring for the electrostatic anode and cathode and the control device for the liquid 1 dispensing valve. FIG. 12 shows a crossectional view of barrel 108 and shows the placement of liquid line 132, liquid line 140 and air line 122, as well as electrical connections 200 and 202 to the liquid 1 dispensing valve and electrical connection 204 to the electrostatic cathode and electrical connection 206 to the electrostatic anode. Nozzle assembly 112 is attached to the end of flexible barrel 110 and will be described in more detail with reference to FIG. 8.

FIG. 7 shows a view of the handle portion of wand 100, partially broken away to show the inner detail. Base 119 has an electrical connection, a connection for the air line and a connection for the two liquid lines to flexible hose 80, not shown. Power line 150 is connected to the electronics as more fully described with reference to FIG. 9. Liquid line 140 for liquid 1 enters the base 119 and passes directly to nozzle assembly 112. Air line 120 enters air manifold 121 and splits into air line 122 which provides air to nozzle assembly 112 and into electrical pulsing unit 128 which provides air pulses through air line 124 to air inlet 133 of pulsing valve 134 Liquid line 130 enters liquid inlet 131 of pulsing valve 134 and leaves through liquid line 132 as pulses of liquid to nozzle assembly 112. Pulsing valve 134 is a normally closed pneumatically controlled valve and is opened by application of air pressure. When electrical pulsing unit 128 is switched off, no liquid will flow through pulsing valve 134. Therefore this valve functions not only to pulse the liquid in liquid line 132 but also acts as an on-off flow valve.

In FIG. 8, liquid channel 240 in sprayer body 272 is in fluid communication with liquid line 140, liquid channel 232 is in fluid communication with liquid line 132 and the air channel 223, shown in FIG. 13, is in fluid communication between nozzle air manifold 222 and air line 122. Air line 122 has air flowing through it at all time the apparatus is in operation. Sprayer body 272 has channels 201, 205 and 207 for passage of the electrical lines to the electromagnet and the electrostatic cathode and anode.

Liquid channel 240 terminates in annular space 242 around cutoff needle 212. Between the termination of liquid channel 240 and cutoff needle 212 is placed filter 220. Filter 220 will remove any foreign particles in the liquid to be sprayed to prevent clogging of the orifices in cutoff cup 225 and sprayer nozzle 226. Cutoff needle 212 is held in the closed position against cutoff cup 225 by spring 211. Cutoff cup 225 is held in place by nozzle adapter 219. Sprayer nozzle 226 is held in place by sprayer cap 228. 0-Ring 218 seals the space between sprayer body 272 and nozzle adapter 219. Electromagnet assembly 210 includes spring 211, cutoff needle 212, electromagnet coils 213 and electromagnet body 214. Electromagnet assembly 210 is held in place in sprayer body 272 by 0-rings 216 and 217. When electromagnet assembly 210 is activated by the operator as will be described later, cutoff needle 212 moves backward from cutoff cup 225 against spring 211 and allows liquid 1, which is under air pressure from tank 40 to flow through cutoff cup 225 into sprayer nozzle 226 to be sprayed as a wet course spray.

Liquid 2 flows in a pulsed fashion from pulsing valve 134 through liquid line 132 which is in fluid communication with liquid channel 232. Liquid channel 232 is in fluid communication with nozzle liquid channel 262 through the center of nozzle body 260. Air from nozzle air manifold 222, which is an annular space in sprayer body 272 and surrounds the nozzle liquid channel 262, is not in fluid communication with channel 262. Nozzle air manifold 222 is in fluid communication with nozzle air channel 224 through a series of holes in anode 250 and electrode gasket 252. When pulsing valve 134 is operated, liquid flows through liquid line 132 to channel 232 to nozzle channel 262 and is mixed with air from nozzle air channel 224. Although only one nozzle channel is shown, there may be a series of such channels. In one embodiment there are a total of three nozzle air channels 224. Air from nozzle air channels 224 is mixed with the pulsed liquid coming from nozzle liquid channel 262 in sprayer nozzle 290.

Nozzle body 260 is made of an electrically conductive material and is in electrical contact with electrostatic anode 250. Anode 250 is in electrical contact with electrical connection 206. Air cap electrode 280 places a positive charge at a high voltage on the liquid to be sprayed through air cap orifice 284 and assists in dispersing the particle in a fine mist. Air cap electrode 280 is in electrical contact with electrical connection 204 and is protected by air cap cover 282 which is electrically insulating.

In FIG. 9, which is a schematic of the electrical circuits for wand 100, a source of +14 volts DC 500, from line 150 is connected to three microswitches 502, 504 and 506. Each microswitch has a corresponding LED 510, 512 and 514 and a diode 516, to prevent the reverse flow of electricity through the switches. Each LED is connected to ground through a 1K ohm resistor. Light 104 is also connected to power source 500 and to ground.

Microswitch 502 controls the pulsing of liquid 2 and the flow of liquid through pulsing valve 134. Microswitch 502 is connected through line 522 to poles 4 and 8 of a 555 integrated circuit timing chip 520 and to a 3K ohm resistor 524. The output of resistor 524 is connected to pole 7 of chip 520 and to a 36K ohm resistor 526. Resistor 526 is connected to poles 2 and 6 of chip 520 and to 4.7 mfd capacitor 532. The output of capacitor 532 is connected to common 540. Pole 1 of chip 520 is also connected to common 540 and pole 5 of chip 520 is connected to common 540 through a 0.01 mfd capacitor. Pole 3 of chip 520 is connected to line 538 which is connected to electrical pulsing unit 128. While electrical pulsing unit can be any convention unit, the present embodiment uses a Clippard ETM3 unit. The output of electrical pulsing unit 128 is connected to common 540. Trigger 102 is connected to common 540 by line 562 and when trigger 102 is closed send common 540 to ground potential. When microswitch 502 is closed and trigger 102 is closed, electrical pulsing unit 128 causes the air in air line 124 to pulse. This causes pulsing valve 134 to impart a pulse to liquid flowing through liquid line 132. Pulsing valve 134 operates such that when there is no air pressure in air line 124, no liquid flows through pulsing valve 134. Opening trigger 102 causes the flow of liquid in liquid line 132 to stop.

Microswitch 504 controls the electrostatic generator. Switch 504 is connected to line 550 which connects to 22 ohm resistor 552 at the positive input terminal of high voltage power supply 554. The negative input terminal of high voltage power supply 554 is connected by line 556 to common 540. High voltage power supply 554 converts the +14 VDC to a high voltage, typically 5000–6000 VDC for the electrostatic electrodes. Any suitable power supply can be used. In the present embodiment a Standard Energy SC50 is used. The positive output terminal of high voltage power supply 554 is connected to a 5.6 M ohm resistor 560. Resistor 560 is connected to electrical connection 204 which connects to the air cap electrode 280. The Negative output terminal of high voltage power supply 554 is connected by electrical connection 206 to anode 250. When microswitch 504 and trigger 102 are closed a high voltage is placed across air cap electrode 280 and anode 250. The liquid, if it has the right electrical properties can then have an electrostatic charge placed on it, which further enhances performance of the pesticide.

Microswitch 506 is connected to electrical connection 200 which is connected to electromagnet assembly 210. Line 202 from electromagnet device is connected to common 540. When microswitch 506 is closed and trigger 102 is closed the electromagnet opens the valve to dispense liquid 1.

Referring to figures 10 and 11, the chiller device 72 has a base 600 which encloses a fan 616. Base 600 is open so that fan 616 can circulate air through vents 618 in the bottom of base 600 through the fins of radiators 612 and 612*a* and out through opening 620 on each side of chiller 72. Chiller 72 has a central chiller assembly 626 which is thermally conductive and includes inlet 614, which is attached to liquid line 66, a piping arranged in a tortuous path 628 and an outlet 630, which is attached to liquid line 65. Chiller 72 is operated by using two peltier chips 604, which are placed in thermal communication with chiller assembly 626 and radiators 612 and 612*a*, respectively. An electrically insulating, but heat conductive gasket 608 is paced between peltier chip 604 and chiller assembly 626 and both peltier chips are surrounded by an insulating material 606 and 606*a*. A cover 610 is placed between gasket 608 and chip 604.

STATEMENT OF INDUSTRIAL APPLICABILITY

This invention is useful in the field of professional pest elimination services. It provides a single unit which can deliver both residual and knock-down types of pesticide and which can deliver these materials in an optimum manner.

What is claimed is:

1. A self-contained insect control device comprising:

A) a mobile platform which includes:
  - i) a first supply means for a first pesticide;
  - ii) a second supply means for a second pesticide; and
  - iii) air pressure supply means;

B) a delivery wand for spraying pesticides in communication with the first supply means, the second supply means, and the pressure supply means; the wand including means to selectively dispense the first pesticide, the second pesticide or both the first and second pesticides; the wand further including means to pulse the flow of the first pesticide and to mix the first pesticide with air; and the wand further including means to place an electrostatic charge on the first pesticide as it is sprayed from the wand.

2. The device of claim 1 wherein the mobile platform also includes means to cool the first pesticide.

* * * * *

UNITED STATES PATENT AND TRADEMARK OFFICE
CERTIFICATE OF CORRECTION

PATENT NO. : 5,064,123

DATED : Nov. 12, 1991

INVENTOR(S) : Aiello et al.

It is certified that error appears in the above-identified patent and that said Letters Patent is hereby corrected as shown below:

On the title page, item [75], Inventors: should read as follows:

Inventors: Salvatore F. Aiello; Edward J. Lazzeroni, Sr., both of Caledonia; John F. Quella, Racine; Cyril Quella, Racine, William J. Maurino, Kenosha; Donald F. Karasek, Racine; Jeffrey K. Brown, Wind Point, all of Wis.

Signed and Sealed this

Second Day of March, 1993

Attest:

STEPHEN G. KUNIN

Attesting Officer

Acting Commissioner of Patents and Trademarks